(12) United States Patent
Braennstroem et al.

(10) Patent No.: US 8,755,998 B2
(45) Date of Patent: Jun. 17, 2014

(54) METHOD FOR REDUCING THE RISK OF A COLLISION BETWEEN A VEHICLE AND A FIRST EXTERNAL OBJECT

(75) Inventors: Mattias Braennstroem, Goeteborg (SE); Andrew Backhouse, Goeteborg (SE); Lars Hammarstrand, Varekil (SE); Christian Applehult, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 78 days.

(21) Appl. No.: 13/367,678

(22) Filed: Feb. 7, 2012

(65) Prior Publication Data

US 2012/0203418 A1    Aug. 9, 2012

(30) Foreign Application Priority Data

Feb. 8, 2011 (EP) .................. 11153612

(51) Int. Cl.
*G06F 17/10* (2006.01)
*G06G 7/78* (2006.01)
*G08G 1/16* (2006.01)

(52) U.S. Cl.
USPC ........... 701/301; 701/36; 701/45; 701/117; 340/903; 340/961; 340/436; 180/271; 180/274; 342/455

(58) Field of Classification Search
USPC .......... 701/1, 23, 24, 36, 41, 45, 48, 70, 300, 701/301, 302; 342/454, 455, 456; 180/232, 180/271, 274, 275, 280; 340/901, 903, 961, 340/436, 3.41
See application file for complete search history.

(56) References Cited

U.S. PATENT DOCUMENTS

| 6,353,788 | B1 * | 3/2002 | Baker et al. ............. 701/96 |
| 8,428,860 | B2 * | 4/2013 | Schutyser et al. ......... 701/301 |
| 2007/0255480 | A1 * | 11/2007 | Southall et al. ........... 701/96 |
| 2008/0189040 | A1 * | 8/2008 | Nasu et al. ............... 701/301 |
| 2010/0063736 | A1 * | 3/2010 | Hoetzer .................. 701/301 |
| 2010/0114418 | A1 * | 5/2010 | Samuel et al. ............ 701/29 |
| 2010/0114467 | A1 * | 5/2010 | Samuel et al. ............ 701/119 |

FOREIGN PATENT DOCUMENTS

EP    2172920 A1    4/2010

* cited by examiner

*Primary Examiner* — Rami Khatib
(74) *Attorney, Agent, or Firm* — Brooks Kushman P.C.

(57) ABSTRACT

A method for reducing the risk of a collision between a vehicle and at least a first external object is contemplated. The risk of a collision may be reduced with use of a collision avoidance system having a detection unit adapted to issue a control signal in the event it detects a collision involving a first external object in a vicinity of the host vehicle, and an action unit adapted to operate the collision avoidance system such that an emergency maneuver can be initiated by the collision avoidance system at an earlier stage if the control signal is issued, as compared to when no control signal is issued.

16 Claims, 2 Drawing Sheets

METHOD FOR REDUCING THE RISK OF A COLLISION BETWEEN A VEHICLE AND A FIRST EXTERNAL OBJECT

CROSS-REFERENCE TO RELATED APPLICATIONS

This application claims foreign priority benefits under 35 U.S.C. §119(a)-(d) to EP 11153612.4, filed Feb. 8, 2011, the disclosure of which is incorporated in its entirety by reference herein.

TECHNICAL FIELD

The present invention relates to a method for reducing the risk of a collision between a vehicle and a first external object. The invention further relates to a collision avoidance system for a vehicle.

BACKGROUND

Every year many persons are involved in traffic-related accidents resulting in injury or death. In order to reduce the number of accidents and/or to reduce their impact, vehicle safety systems have been developed.

Protective safety systems, such as bumpers, seat belts, crumple zones and air-bags have been in use for many years. They work by dispersing the kinetic energy resulting from a collision in order to protect the occupants of the vehicle.

In addition to the protective safety systems, another type of safety systems has been introduced in the recent years. These in-vehicle systems are designed to help the driver to prevent, avoid or mitigate an impending collision or accident. They are therefore called preventive safety systems. Advanced preventive safety systems work by not only sensing the motion of vehicle hosting the system but also perceiving the traffic situation around the vehicle. They are able to inform the driver of possible danger, to warn the driver of an impending accident, and to detect and classify dangerous situations. In addition, the system may actively assist or intervene in the operation of the vehicle in order to avoid the accident or mitigate its consequences.

A collision avoidance system is an example of a preventive safety system. If a collision is likely to occur and the system detects that the driver does not react in an appropriate manner, the system may be adapted to apply an emergency operation and/or to warn the driver. For example, when the system determines that a collision is unavoidable, it may apply an autonomous brake to the vehicle. If the speed is too high to be able to avoid the obstacle ahead, e.g. a lead vehicle, the system may at least help to lower the speed in order to reduce the consequences of the collision. As described herein, the term collision avoidance system is used for systems adapted to avoid collisions as well as systems mitigating the consequences of a collision. Often, the difference between whether a collision is avoided or not, depends on the speed of the host vehicle and the relative speed to the obstacle.

The term host vehicle is herein used to refer to the own vehicle, which hosts a collision avoidance system. The term lead vehicle is used to refer to the vehicle located closest to, and in front of the host vehicle. Normally the lead vehicle is driving in essentially the same direction as the host vehicle.

In general, a collision avoidance system comprises three separate subsystems: a perception system, a detection system and an action system. The perception system comprises different sensors, which are used to determine the motion of the host vehicle and to perceive the traffic situation therearound. The detection system uses the output of the perception system in order to detect possible adverse situations and make a decision to inform, warn or intervene. The action system executes the action or actions decided by the detection system.

The execution of a possible intervention is a trade-off between effectiveness of the collision avoidance system and the risk of having a false alarm. It is for example undesirable that the collision avoidance system brakes the host vehicle without there actually being a real emergency situation.

In rush-hour-traffic, the traffic is often dense and the time-gap between vehicles can be small. If the driver of a lead vehicle for some reason collides with another external object, such as a third vehicle being in front of the lead vehicle, it can be difficult for the driver of the host vehicle to avoid a collision without assistance, since, due to the collision, the lead vehicle very suddenly and unpredictably changes its motion. There is therefore very little time for the driver of the host vehicle to react to the sudden change in the traffic situation and make an appropriate decision in order to avoid and/or mitigate a collision with the lead vehicle. As mentioned above, a collision avoidance system according to known technology could help the driver of the host vehicle by intervening in such a situation. However, due to the trade-off of the execution between effectiveness and the desire to avoid false interventions mentioned above, the host vehicle may come quite close to the lead vehicle before the emergency operation is initiated. The host vehicle may come so close that a collision with the lead vehicle cannot be avoided.

The document EP 2 172 920 A1 discloses an onboard warning system for detecting a presence of external objects, e.g. other vehicles, within a detection area. The system measures the acceleration of the external object and reacts if it exceeds a threshold value. This may happen when the external vehicle performs an emergency braking and/or steering manoeuvre. A warning signal is then generated.

However, even if a collision involving the lead vehicle sometimes is preceded by a rapid change of acceleration of the lead vehicle, such as a hard braking, there are also many cases, in which a collision involving the lead vehicle occurs without being preceded by a rapid change of acceleration of the lead vehicle, or without the rapid change of acceleration being observed, e.g. due to a sensor being obscured by another object. The lead vehicle itself may be hit by another vehicle and suddenly be thrown in an unpredicted direction. Another case would be that the lead vehicle collides with a pedestrian or an animal, which are rather light objects in comparison to the vehicle, not changing the acceleration of the lead vehicle very much.

It is therefore desired to provide an improved collision avoidance system, which can better handle a situation than an existing collision avoidance system when a collision involving a first external object occurs in the vicinity of the host vehicle. It is further desirable to provide a method suitable for reducing the risk of a collision between the host vehicle and the first external object in such a situation.

SUMMARY

One aspect of the invention is to reduce or ameliorate at least one of the disadvantages of the prior art, or to provide a useful alternative.

This object is achieved by a method described herein.

As such, a first aspect of the present invention relates to a method for reducing the risk of a collision between a vehicle hosting a collision avoidance system and a first external object. The method may comprise:

detecting if a collision involving the first external object has occurred in a vicinity of the host vehicle, and operating the collision avoidance system of the host vehicle, such that an emergency manoeuvre can be autonomously initiated by the collision avoidance system at an earlier stage if a collision was detected, as compared to if no collision was detected.

The host vehicle is the vehicle hosting the collision avoidance system. The first external object is commonly a lead vehicle, but it may also be an oncoming vehicle or a crossing vehicle. By external is meant that it is outside of the vehicle.

The objective of the emergency manoeuvre is to avoid that the host vehicle collides with the first external object, which first external object already is involved in a collision with something else, or at least to mitigate the consequences for the host vehicle of such a collision with the first external object.

The collision situation involving the lead vehicle may comprise that the lead vehicle collides with a second external object, e.g. a vehicle driving in front of the first external object, an oncoming vehicle or a crossing vehicle. This could be the case in a multiple vehicle crash situation. The second external object may also be another road user such as a pedestrian, bicyclist or motor cycle. The collision could also be with something suddenly entering the road, such as an animal jumping onto the road in front of the lead vehicle. The first external object may also collide with a still-standing second external object such as a road sign, a guard rail, a drainage lid, a traffic light or a hole in the road.

The term vicinity is used to indicate an area of interest around the host vehicle from a vehicle safety point of view, i.e. the area characterized by that if the collision would occur in this area, the host vehicle would be influenced if no measures were to be taken. The vicinity is related to the host vehicle and therefore moves along together with the host vehicle. It may comprise an area, in which it is feasible for the host vehicle to pass during the next few seconds, for example within the next 1, 2 or 3 seconds. In particular, the vicinity comprises the area the host vehicle is expected to pass during the next few seconds, i.e. the area in or close to that of an intended travelling path of the host vehicle. The shape and the size of the vicinity may be speed dependent, such that, e.g. the size of the vicinity increases with the speed of the host vehicle. The shape may be elongated, e.g. elliptic, but other shapes including more complicated geometries are possible. The size and shape may further be influenced by external factors such as traffic conditions, e.g. low or dense traffic, weather conditions, e.g. precipitation, or road conditions, e.g. muddy, snowy or icy road. Typically, the vicinity has a maximal extension of between 100 and 200 meters, i.e. maximum distance from the host vehicle to the other edge of the vicinity. The size of the vicinity may further be influenced by the detection range of the sensors used in the collision avoidance system, such that the sensors are capable of detecting objects within this area.

Optionally, the detection is carried out continuously or intermittently, at least as long as the host vehicle is moving.

In a situation wherein the collision avoidance system detects that a collision involving the host vehicle is likely and that the driver does not react, the collision avoidance system is adapted to apply an emergency manoeuvre. In case the collision avoidance system is informed that a collision has occurred, as detected in the detection step, an emergency manoeuvre can be autonomously initiated by the collision avoidance system at an earlier stage, as compared to the case when no collision has been detected.

At an earlier stage could mean up to 0.5, 1, 2 or 3 seconds earlier than if no collision was detected. Since the collision avoidance system thereby can react up to 0.5, 1, 2 or 3 seconds earlier than for example a prior art collision avoidance system, it is able to avoid collisions at higher speeds as compared to a prior art collision avoidance system. Purely as an example, the collision avoidance system and the method according to the invention may be able to avoid collisions in multiple crash scenarios with speed differences, which are up to 70-120 km/h without increasing the risk of an unnecessary intervention, while prior art collision avoidance systems may only adequately handle speeds up to 35-45 km/h.

With the method and collision avoidance system according to the invention, earlier interventions are acceptable since the collision avoidance system is able to estimate with a high probability that the host vehicle is in a critical situation, since the first external object already is in a critical situation. Further, the driver of the host vehicle has very little time to react and understand how critical the situation is. Additionally, it is difficult for the driver of the host vehicle to predict where the first external object is going. The driver of the first external object will probably also be unable to improve the situation.

In a conventional method lacking the above-mentioned detection step for detecting whether a collision involving the first external object has occurred or not, the collision avoidance system tracking the first external object would not be able to determine if an unexpected change of motion of the first external object, e.g. the lead vehicle, is a true or false observation. In order to avoid performing an erroneous intervention, the conventional system would probably firstly verify the observation before initiating the emergency manoeuvre, for example by making one or more additional observations. If not making these additional observations, the risk of making a false intervention would be high, in many cases unacceptably high. The number of additional measurements being made influences how much time that will pass before the emergency manoeuvre is initiated; time which is very valuable in a critical traffic situation.

When using the method according to the invention, which includes the detection step, the collision avoidance system would be informed that the sudden, unexpected change of motion of the first external object would be due to the collision, if such an incident has been detected. The system may thus autonomously initiate the emergency manoeuvre immediately or at least with fewer additional observations than would have been used according to the corresponding conventional method, thus saving time. This improvement of the performance of the collision avoidance system could help to avoid a collision or a least mitigate its consequences. It may be particularly helpful in a multiple vehicle crash situation.

If no collision is detected, and the collision avoidance system is anyway activated, for example if the host vehicle is coming too close to the lead vehicle, without anything in particular having happened to the lead vehicle, the emergency manoeuvre is normally executed in a similar way both according to the invention and according to a conventional method. In such a case where there is enough distance between the host vehicle and the lead vehicle, it does not matter if the emergency manoeuvre is initiated somewhat later, since there normally anyway is enough time to carry out the emergency manoeuvre, in order to avoid an impending collision involving the host vehicle. There is thus time to make one or more additional observations.

Further, according to the method of the invention, it may be assumed that the collision involving the first external object has occurred recently, for example during the last 1, 2 or 3 seconds, corresponding to being in the vicinity of the host vehicle. If the collision did not occur recently, which corresponds to that the collision is located further away from the host vehicle, i.e. not being in the vicinity of the host vehicle, the collision avoidance system will be operated in a similar manner as a conventional system. The collision in that case occurs so far away from the host vehicle that it does not matter for the function of the emergency manoeuvre that it is initiated somewhat later, since there anyway is enough time due to the larger distance to carry out the emergency manoeuvre, in order to avoid an impending collision involving the host vehicle.

The above-mentioned difference that an emergency manoeuvre can be autonomously initiated by the collision avoidance system at an earlier stage if a collision was detected, as compared to when no collision was detected, could in the example given above be due to the fact that the collision avoidance system makes no or at least fewer additional observations before carrying out the emergency manoeuvre.

The difference between the present invention and a conventional method is thus most clearly seen in cases when the detected collision involving the first external object is located close to the host vehicle, since the earlier initiation of the emergency manoeuvre would have the greatest influence on the final outcome for these cases. As an example, an early initiation may be the difference between avoiding the collision and having the collision with the lead vehicle. It may also be the difference between a minor collision and a more severe collision. The definition of what is located close depends on factors such as the position, speed and acceleration of the host vehicle as well as of the first external object.

Even if the examples above describe situations, involving a lead vehicle as the first external object, the method and the collision avoidance system according to the invention may alternatively be applied for oncoming or crossing vehicles as the first external object.

In an embodiment the triggering of the initiation of the emergency manoeuvre is dependent on the recentness and/or the severity of the detected collision involving the first external object.

The more recently the collision involving the first external object occurred, the earlier it is desirable to initiate the emergency manoeuvre:

if the collision occurred many seconds ago, an initiation with a first delay is applied, if the collision occurred a few seconds ago, an initiation with a second delay is applied, the second delay being shorter than the first delay, if the collision is ongoing, or just occurred, an initiation with a third delay is applied, the third delay being shorter than the second delay.

The first delay may be of substantially the same length as in a conventional collision avoidance system, the second delay may correspond to an earlier intervention than in a conventional collision avoidance system, and the third delay may correspond to an extra early intervention. Purely as an example, many seconds may refer to more than 3 seconds, a few seconds may be 1-3 seconds and just occurred may refer to the last 1 second. Alternatively, many seconds may refer to more than 5 seconds, a few seconds to 1-5 seconds and just occurred may to the last 1 second.

Further, the more severe the collision involving the first external object is, the earlier it is desirable to initiate the emergency manoeuvre:

if a minor collision, an initiation with a fourth delay is applied, if a moderately severe collision, an initiation with a fifth delay is applied, the fifth delay being shorter than the fourth delay, if a severe collision, an initiation with a sixth delay is applied, the sixth delay being shorter than the fifth delay.

The fourth delay may be of substantially the same length as for a conventional collision avoidance system, the fifth delay may correspond to an earlier intervention than in a conventional collision avoidance system, and the sixth delay may correspond to an extra early intervention. Further, the fourth delay may be substantially equal to the first delay, the fifth delay may be substantially equal to the second delay and the sixth delay may be substantially equal to the third delay. The delays may be used for making one or more additional observations.

A minor collision may be defined by that there is substantially no risk of injury for the passengers in the first external object and/or the change of the speed of the first external object is less than 5 or 10 km/h, e.g. colliding with a flying bird or running over a small animal. A moderately severe collision may be defined by that there is a risk of personal injury for the passengers in the first external object and/or the change of the speed of the first external object is about 10-20 km/h. A severe collision may be defined by that there is a high risk of personal injury for the passengers in the first external object and/or the change of the speed of the first external object is over 20 or 30 km/h.

In an embodiment the method further comprises:

assessing a state of the first external object located in the vicinity of the host vehicle, wherein the collision avoidance system, before autonomously initiating the emergency manoeuvre, checks if a collision involving the first external object was detected or not:

if no, the collision avoidance system performs a control step in order to increase the accuracy of the assessed state at least once before autonomously initiating the emergency manoeuvre, and if yes, the collision avoidance system autonomously initiates the emergency manoeuvre at an earlier stage as compared to if no collision was detected.

The dynamic state (hereafter referred to simply as the "state") of the first external object may include state variables such as position, velocity, acceleration, heading angle, yaw rate, roll angle, roll rate, pitch angle, pitch rate and/or shape of the first external object or combinations thereof. These state variables may be assessed in relation to the ground or in relation to another vehicle. In particular, the state variables of the first external object may be assessed in relation to the host vehicle. Purely as an example, assessing the position of the first external object in relation to the host vehicle, would give the distance between the host vehicle and the first external object. A change of the state could in that example correspond to a decrease of the assessed distance between the host vehicle and the first external object.

The control step mentioned above, could in this embodiment be a verification of the assessed state, for example by performing additional assessments of the state in order to see if the different assessments correspond to each other. The assessment may for example be measurements. Since the host vehicle is moving during making the additional state assessments, it is not expected that the different measurements should be equal, but that they should correspond to each other taking the motion of the host vehicle and the lead vehicle into consideration. In the event that a collision was detected, the emergency manoeuvre may thus be initiated at an earlier stage due to the fact that no or at least fewer additional state assessments are made.

In an embodiment, the emergency manoeuvre comprises an autonomous braking operation, an autonomous steering operation and/or giving a warning signal. These operations may performed individually, be combined two and two, or be combined all three. The warning may be given to the driver and/or to other road users. For example, the collision avoidance system may start by autonomously braking the vehicle, i.e. braking without involving the driver. At the same time the driver is warned, for example by a sound or flashing lights. If the system then establishes that the vehicle can not be brought to a stand still in front of the first external object, the system may then decide to steer the vehicle around the first external object.

In the case that the emergency manoeuvre comprises an autonomous braking operation, the characteristics of the autonomous braking operation may be selected based on the basis of whether a collision was detected or not. For example, if, as explained above, the autonomous braking operation is initiated earlier as compared to in a conventional method, it would be possible to brake less hard and yet avoid the impending collision.

The method according to the invention may further comprise:
considering two parallel traffic situation hypotheses for the vicinity, a first hypothesis being a normal traffic situation and a second hypothesis being a collision situation,
selecting one of the hypotheses based on if a collision has been detected or not, and
basing the operation of the collision avoidance system on the selected hypothesis.

A normal traffic situation is a traffic situation in which the first external object is not involved in a collision. A collision situation is a traffic situation in which the first external object is involved in a collision.

As already explained above, the emergency manoeuvre may be initiated at an earlier stage if the second hypothesis has been selected, as compared to when the first hypothesis has been selected.

A second aspect of the present invention relates to a collision avoidance system for a vehicle comprising:
a detection unit adapted to issue a control signal in the event it detects a collision involving a first external object in a vicinity of the host vehicle, and
an action unit adapted to operate the collision avoidance system, such that an emergency manoeuvre can be autonomously initiated by the collision avoidance system at an earlier stage if the control signal is issued, as compared to when no control signal is issued.

The control signal may be adapted to have at least two states: an active state, being issued if a collision is detected in the vicinity of the host vehicle, and a passive state, being issued when no collision is detected in the vicinity of the host vehicle. The two states may be represented by a 1 for active and a 0 for passive or vice versa. The control signal may be issued the whole time the host vehicle is moving, continuously or intermittently, and change status, from passive to active state, when a collision involving the first external object is detected in the vicinity of the host vehicle.

The collision avoidance system may further comprise:
a state assessment means adapted to assess at least a state of the first external object located in the vicinity of the host vehicle,
before autonomously initiating the emergency manoeuvre, the collision avoidance system checks the status of the control signal:

if passive, the collision avoidance system performs a control step in order to increase the accuracy of the assessed distance at least once before autonomously initiating the emergency manoeuvre, and if active, the collision avoidance system autonomously initiates the emergency manoeuvre at an earlier stage as compared to if passive.

Examples of state variables are given above.

The collision avoidance system may further comprise a first sensor assembly adapted to monitor the vicinity of the host vehicle in order to detect if a collision involving the first external object has occurred. The first sensor assembly may be located in or on the host vehicle. The information from the first sensor assembly may be used as input to the detection unit. Preferably, the monitoring is carried out continuously or intermittently, at least as long as the host vehicle is moving. One, two, three or more sensors may be used for monitoring the vicinity of the host vehicle. If more than one sensor is used, they should preferably be independent of each other. They may use different physical measurements. Input signals from the different sensors may be combined for improving an accuracy of the detection of whether a collision has occurred in the vicinity or not.

The first sensor assembly may be adapted to detect if a collision has occurred involving the first external object in the vicinity of the host vehicle. The first sensor assembly may be acoustic. The first sensor assembly may also be image-based, in which case the monitoring may be performed by looking for the collision itself or for flashing warning blinkers, which especially would work in case the first external object, being involved in the collision, has a system autonomously activating the warning blinkers.

As an alternative, the detection of whether a collision involving the first external object has occurred or not could also be made by vehicle-to-vehicle communication, e.g. from the first external object communicating that it is involved in a collision. The collision may also be detected by an infrastructure system, possibly by the use of sensors, and communicated to the vehicles being close to the collision. In those latter two cases, it can be arranged that a communication is only sent to the detection unit of the host vehicle when a collision actually has occurred or is occurring in the vicinity of the host vehicle.

The severity of the collision involving the first external object may be measured by the first sensor assembly. Purely as an example, assuming the first sensor assembly is acoustic, the severity of the collision may be judged by the loudness and the spectral pattern of the detected sound. Assuming that the first sensor is image-based, image analysis may be used to detect the severity of the crash, for example by evaluating the change of the shape of the first external object. The severity of the collision may also be communicated by vehicle-to-vehicle communication or from the infrastructure. In addition, the severity of the collision may also be judged by measuring the change in speed or acceleration of the first external object at the collision, which may be part of assessing the state.

The state assessment means may comprise a second sensor assembly adapted to measure a state of the first external object, such as position, velocity, acceleration, heading angle, yaw rate, roll angle, roll rate, pitch angle, pitch rate and/or shape of the first external object or combinations thereof. The second sensor assembly may be used to determine where the collision has occurred. The second sensor assembly may be adapted to use electromagnetic radiation, such as radio waves, light, infrared light or ultraviolet light. It may be one or more of a camera, stereo camera, radar, lidar and/or IR sensor.

In embodiments using both a first and a second sensor assembly, they may be adapted to use different physical measurements.

In a third aspect of the present invention there is provided a vehicle comprising a collision avoidance system as mentioned above.

In a fourth aspect of the present invention there is provided a computer program stored in a readable storage unit and adapted to be used in a collision avoidance system of a host vehicle, the collision avoidance system comprising a detection unit and an action unit, the computer program comprising instruction sets for:

receiving a signal from the detection unit in order to detect if a collision has occurred in a vicinity of the host vehicle, transmitting a second signal to the action unit, operating the collision avoidance system of the host vehicle, such that an emergency manoeuvre can be initiated by the collision avoidance system at an earlier stage if a collision was detected, as compared to when no collision was detected.

The computer program may further comprise instruction sets for carrying out any other appropriate method step as mentioned above.

In a fifth aspect of the present invention there is provided an electronic control unit adapted to:

detect if a collision involving the first external object has occurred in a vicinity of a vehicle, and operating a collision avoidance system of the vehicle, such that an emergency manoeuvre can be initiated by the collision avoidance system at an earlier stage if a collision was detected, as compared to when no collision was detected.

The electronic control unit may further be adapted to carry out any other appropriate method step as mentioned above.

BRIEF DESCRIPTION OF THE DRAWINGS

The present invention will hereinafter be further explained by means of non-limiting examples with reference to the appended figures wherein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention will, in the following, be exemplified by embodiments. It should however be realized that the embodiments are included in order to explain principles of the invention and not to limit the scope of the invention, defined by the appended claims. Details from two or more of the embodiments may be combined with each other. Further modifications of the invention within the scope of the appended claims are feasible. As such, the present invention should not be considered as limited by the embodiments and figures described herein. Rather, the full scope of the invention should be determined by the appended claims.

Even if the examples below describe collisions, in which a lead vehicle is involved, the method and the collision avoidance system according to the invention may also be applied for oncoming or crossing vehicles.

Further, in the examples below, a distance to the host vehicle is used as an example of the assessed state of the first external object. Examples of other state variables are given in the section above, but are not illustrated by examples below.

Figure 1:
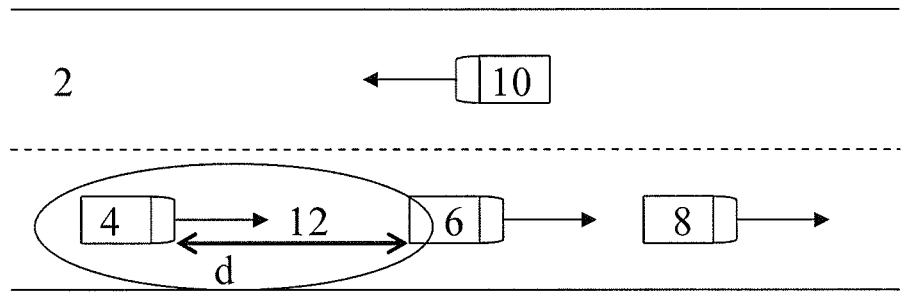
FIG. 1 is a schematic view of a traffic situation.

FIG. 1 schematically illustrates a traffic situation on a road 2. The host vehicle 4, hosting a collision avoidance system, is driving on the road 2. In front of the host vehicle 4 there is a first external object, in this case a lead vehicle 6. There is a second external object in front of the lead vehicle 6, in this case another vehicle 8 driving in substantially the same direction as the host vehicle 4 and the lead vehicle 6. There is also oncoming traffic represented by an oncoming vehicle 10. The objects are here represented by vehicles but they may also be other road users, such as a motor cyclist, bicyclist or pedestrian.

FIG. 1 further indicates the vicinity 12 of the host vehicle 4. If a collision involving the lead vehicle 6 would occur in this area, the host vehicle 4 would be influenced if no measures were to be taken by the driver of the host vehicle 4 and/or by the host vehicle 4 itself. In particular, the vicinity 12 comprises the area the host vehicle 4 is expected to pass during the next few seconds, i.e. the area being in or close to an intended travelling path of the host vehicle. The vicinity 12 is related to the host vehicle 4, it therefore moves along together with the host vehicle 4. The size and shape of the vicinity 12 may depend on factors such as position, speed and/or acceleration of the host vehicle. It may also be influenced by external factors such as traffic conditions, e.g. low or dense traffic, weather conditions, e.g. precipitation, or road conditions, e.g. muddy, snowy or icy road. The vicinity 12 may have an elliptical shape like in the illustrated embodiment, wherein the major axis of the ellipse substantially coincides with the expected travelling path of the host vehicle 4.

Figure 2:
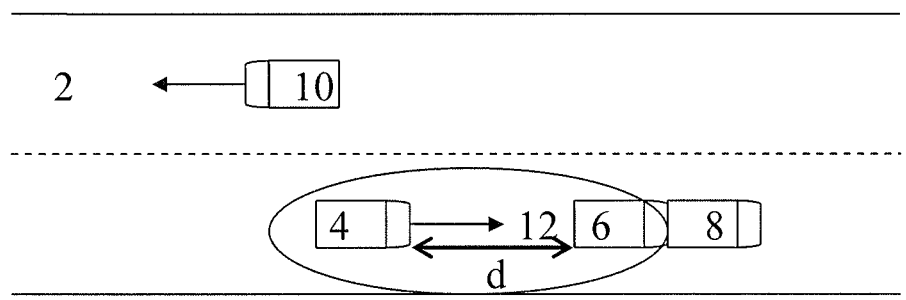
FIG. 2 is a schematic view of the traffic situation after a collision has occurred.

FIG. 2 illustrates the same road 2 a few moments later as compared to FIG. 1. The host vehicle 4 has moved to the right in the figure. A collision has occurred between the lead vehicle 6 and the other vehicle 8. Purely as an example, the collision might have occurred due to the fact that the driver of the lead vehicle 6 was distracted and did not notice that the other vehicle 8 was braking. The lead vehicle 6 consequently very suddenly and unpredictably changes its motion due to the collision.

Figure 3:
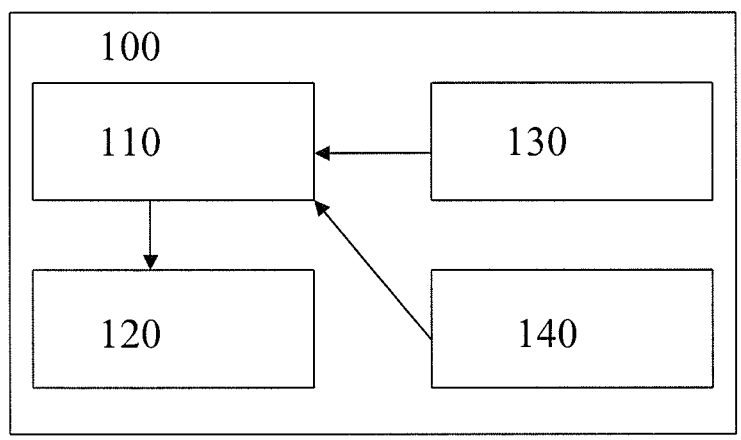
FIG. 3 illustrates a collision avoidance system according to the invention.

It is assumed that the host vehicle 4 comprises a collision avoidance system 100 according to the invention as illustrated in FIG. 3. The collision avoidance system 100 comprises:

a detection unit 110 adapted to issue a control signal in the event it detects a collision in the vicinity of the host vehicle, and an action unit 120 adapted to operate the collision avoidance system 100, such that an emergency manoeuvre can be autonomously initiated by the collision avoidance system 100 at an earlier at stage if a collision was detected, as compared to when no collision was detected.

The collision avoidance system 100 may further comprise one or more sensor assemblies, here represented by a first sensor assembly 130 and a second sensor assembly 140.

In the illustrated embodiment, the first sensor assembly 130 is adapted to detect if a collision has occurred. It may for example be an acoustic sensor adapted to detect the sound of a possible collision. Alternatively it may be image-based and adapted to visually identify a possible collision.

The second sensor assembly 140 is adapted to measure at least one state of the first external object 6, such as position, velocity, acceleration, heading angle, yaw rate, roll angle, roll rate, pitch angle, pitch rate and/or shape of the first external object or combinations thereof. The second sensor assembly 140 may use electromagnetic radiation, such as radio waves, light, infrared light or ultraviolet light. It may be a camera, stereo camera, radar, lidar and/or IR sensor. Since the second sensor assembly 140 can keep track of the lead vehicle, it can be used to determine where a collision involving the lead vehicle 6 has occurred. Alternatively, the state may be assessed by means of an external system, such as GPS or being part of the infrastructure.

Figure 4:
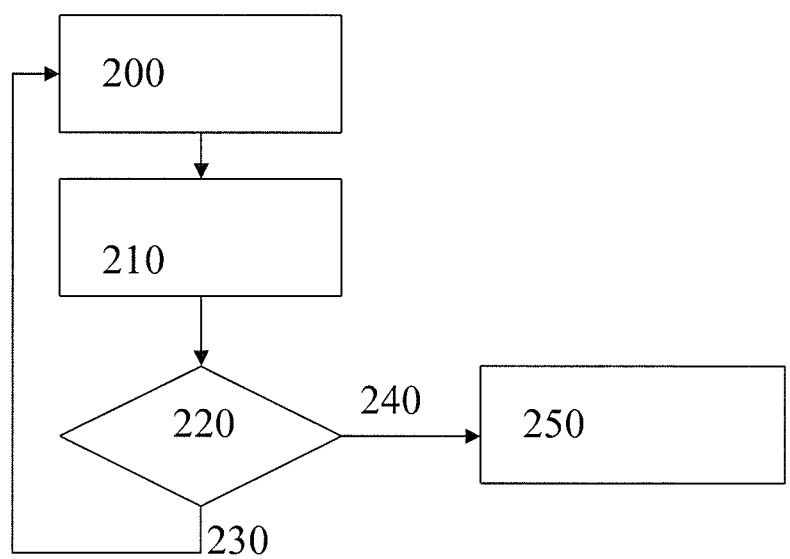
FIG. 4 is a flowchart of a method according to the invention.

FIG. 4 illustrates a flowchart for a method for reducing the risk of a collision between a vehicle 4 and a first external object 6. The method comprises:

200: assessing a state of the first external object located in the vicinity of the host vehicle.

210: detecting if a collision has occurred in the vicinity of the host vehicle, and 220: operating a collision avoidance system of the host vehicle, such that an emergency manoeuvre can be initiated by the collision avoidance system at an earlier stage if a collision was detected, as compared to when no collision was detected.

The step of assessing a state 200 is optional. It may be performed by the second sensor assembly 140. The steps of assessment 200 and detection 210 may be performed in parallel or after each other. Preferably, the method is carried out continuously or intermittently, at least as long as the host vehicle 4 is moving. This is illustrated by the arrow 230 in FIG. 4 indicating a loop.

The method may further comprise a step of monitoring the vicinity of the host vehicle with the first sensor assembly 130, however not illustrated in FIG. 4. This step may be performed in parallel to the assessment step 200. The information from the first sensor assembly 130 may be used as input to the detection unit 110 and used in the detection step 210. As mentioned above, the information that a collision has occurred could instead be detected by vehicle-to-vehicle communication, e.g. the lead vehicle 6 communicating that it is involved in a collision. The collision may also be detected by an infrastructure system and communicated to the vehicles being close to the collision.

If a collision involving the first external object has been detected 240, the collision avoidance system 100 of the host vehicle 4 is operated, see step 220, such that an emergency manoeuvre can be initiated 250 by the collision avoidance system 100 at an earlier stage, as compared to when no collision was detected, 230. If no collision was detected, the method returns to the optional state assessment step 200 or directly to detection step 210, see arrow 230.

If no collision was detected 230 and the collision avoidance system 100 is nevertheless activated, for example if the host vehicle 4 is coming too close to the lead vehicle 6, the collision avoidance system 100 is operated like a conventional collision avoidance system. This case is not illustrated by FIG. 4.

The above method steps may be performed as a set of instructions of computer program stored in a readable storage unit. Further, the above method steps may be carried out by an electronic control unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   operating a collision avoidance system of a host vehicle to assess a dynamic state of a first external object;
   continually establishing, based on the dynamic state of the first external object, a first value of a delay period within which initiation of an emergency maneuver is necessary to avoid or mitigate a collision between the host vehicle and the first external object;
   detecting, during the delay period, whether a collision situation exists involving the first external object relative to a second external object; and
   if the collision situation is detected, reducing the delay period to a second value less than the first value.

2. The method according to claim 1, wherein the second value of the delay period is dependent on at least one of a recentness and a severity of the detected collision situation.

3. The method according to claim 1, wherein said emergency maneuver comprises at least one of an autonomous braking operation, an autonomous steering operation and giving a warning signal.

4. The method according to claim 1, wherein the method further comprises:
   considering two parallel traffic situation hypotheses, a first hypothesis being a normal traffic situation wherein no collision situation is detected and a second hypothesis being the collision situation has been detected,
   selecting one of said hypotheses based on if the collision situation has or has not been detected, and
   basing initiation of the emergency maneuver on the selected hypothesis.

5. A collision avoidance system for a vehicle comprising:
   a state assessment unit assessing a dynamic state of a first external object;
   a detection unit detecting that a collision situation exists involving the first external object relative to a second external object, and issuing a control signal if the collision situation exists; and
   an action unit a) continually establishing, based on the dynamic state of the first external object, a first value for a delay period within which initiation by the vehicle of an emergency maneuver is necessary to avoid or mitigate a second collision between the vehicle and the first external object; b) reducing the delay period to a second value less than the first value in response to the control signal; and c) initiating the emergency maneuver when the delay period expires.

6. The collision avoidance system according to claim 5, wherein the detection unit comprises a first sensor assembly for monitoring a vicinity of the vehicle in order to detect if a collision involving said first external object has occurred.

7. The collision avoidance system according to claim 6, wherein the state assessment unit comprises a second sensor assembly for measuring dynamic state variables of the first external object.

8. The collision avoidance system according to claim 7, wherein said first and second sensor assemblies are adapted to use different physical measurements.

9. The collision avoidance system according to claim 8, wherein said first sensor assembly is at least one of acoustic and image-based.

10. The collision avoidance system according to claim 9, wherein said second sensor assembly is adapted to use electromagnetic radiation, such as radio waves, light, infrared light or ultraviolet light.

11. The collision avoidance system of claim 10 wherein the detection unit, action unit, and state assessment unit are included within the vehicle.

12. A computer program stored in a non-transitory readable storage unit and adapted to be used in a collision avoidance system of a host vehicle, said collision avoidance system comprising a detection unit and an action unit, said computer program comprising instruction sets for:
 assessing a dynamic state of a first external object located in a vicinity of the host vehicle;
 continually establishing, based on the dynamic state of the first external object, a first value for a delay period within which initiation of an emergency maneuver is necessary to avoid or mitigate a collision between the host vehicle and the first external object;
 receiving a signal from the detection unit indicating whether the first external object is in a collision situation relative to a second external object;
 reducing the delay period to a second value less than the first value if the collision situation exists; and
 transmitting a second signal to the action unit to initiate an emergency maneuver by the host vehicle at expiration of the delay period.

13. The computer program of claim 12 further comprising instructions for:
 considering two parallel traffic situation hypotheses for said vicinity, a first hypothesis being a normal traffic situation and a second hypothesis being the collision situation,
 selecting one of said hypotheses based on if the collision situation has or has not been detected, and
 basing the initiation of the emergency maneuver on the selected hypothesis.

14. The computer program of claim 12 further comprising instructions for initiating said emergency maneuver as at least one of an autonomous braking operation, an autonomous steering operation and giving a warning signal.

15. An electronic control unit operative to:
 assess a dynamic state of a first external object located in a vicinity of a host vehicle;
 continually establish, based on the dynamic state of the first external object, a first value for a delay period within which initiation of an emergency maneuver is necessary to avoid or mitigate a second collision between the host vehicle and the first external object;
 detect whether the first external object is in a collision situation relative to a second external object;
 reduce the delay period to a second value less than the first value if the collision situation exists; and
 operate a collision avoidance system of said vehicle to initiate the emergency maneuver at expiration of the delay period.

16. The electronic control unit of claim 15 operative to:
 consider two parallel traffic situation hypotheses for said vicinity, a first hypothesis being a normal traffic situation and a second hypothesis being the collision situation,
 select one of said hypotheses based on if the collision situation has or has not been detected, and
 base said emergency maneuver on the selected hypothesis.

* * * * *